United States Patent
Stephan

(10) Patent No.: US 10,004,180 B1
(45) Date of Patent: *Jun. 26, 2018

(54) MODULAR ENCLOSURE WITH AUTOMATED CURTAIN DEPLOYMENT

(71) Applicant: GRO-TECH SYSTEMS, INC., Rough and Ready, CA (US)

(72) Inventor: Scott P. Stephan, Grass Valley, CA (US)

(73) Assignee: GRO-TECH SYSTEMS, INC., Rough and Ready, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/600,213

(22) Filed: May 19, 2017

Related U.S. Application Data

(63) Continuation of application No. 15/374,855, filed on Dec. 9, 2016.

(Continued)

(51) Int. Cl.
| | | |
|---|---|---|
| *A01G 9/22* | (2006.01) | |
| *A01G 9/14* | (2006.01) | |

(Continued)

(52) U.S. Cl.
CPC .................. *A01G 9/22* (2013.01); *A01G 9/14* (2013.01); *A01G 9/1407* (2013.01); *A01G 9/26* (2013.01); *E06B 9/24* (2013.01)

(58) Field of Classification Search
CPC .......... A01G 9/227; A01G 9/222; A01G 9/22; A01G 9/26; A01G 9/1407; A01G 9/14; A01G 2009/0492; A01G 9/242; A01G 13/0206; A01G 13/04; E06B 9/24; E04B 2009/0492; E04B 9/303; E04B 1/34357; E04B 1/34363
See application file for complete search history.

(56) References Cited

U.S. PATENT DOCUMENTS

| | | | | | |
|---|---|---|---|---|---|
| 3,415,260 | A | * | 12/1968 | Hall .......................... | B60P 7/02 135/129 |
| 4,062,146 | A | * | 12/1977 | Grossman ................ | A01G 9/22 47/17 |

(Continued)

*Primary Examiner* — Adriana Figueroa
*Assistant Examiner* — Jessie T Fonseca
(74) *Attorney, Agent, or Firm* — Pillsbury Winthrop Shaw Pittman LLP

(57) ABSTRACT

A system for providing an enclosure system with automated light deprivation shade deployment and retraction is described. The system includes a plurality of trusses oriented parallel to each other and including at least a horizontal interior member with two diagonal members extending downwardly from ends thereof and two vertical members extending downwardly from the diagonal members on portions thereof opposite said horizontal member; a shade structure having a fixed edge fixed to one of the trusses and a leading edge; a leader arch coupled to the leading edge and including a horizontal bar extending between two or more diagonal bars at opposite ends thereof, and with vertical bars extending downwardly from the diagonal bars on portions of the diagonal bars opposite the horizontal bar; wires extending longitudinally between the truss members and along lines perpendicular to planes in which the truss members are oriented, and inboard of shade curtains.

14 Claims, 21 Drawing Sheets

Related U.S. Application Data

(60) Provisional application No. 62/265,921, filed on Dec. 10, 2015.

(51) Int. Cl.
*E06B 9/24* (2006.01)
*A01G 9/26* (2006.01)

(56) References Cited

U.S. PATENT DOCUMENTS

| | | | | |
|---|---|---|---|---|
| 4,565,230 A * | 1/1986 | Van Rijn | ............... | A01G 9/22 160/84.01 |
| 4,979,551 A * | 12/1990 | Schon | ............... | A01G 9/22 160/84.03 |
| 4,996,791 A * | 3/1991 | Sprung | ............... | A01G 9/14 47/17 |
| 5,038,517 A * | 8/1991 | Talbott | ............... | A01G 9/242 47/17 |
| 5,311,699 A * | 5/1994 | Huffman | ............... | A01G 9/22 47/22.1 |
| 6,182,737 B1 * | 2/2001 | Kuwabara | ............... | A01G 9/242 160/84.06 |
| 9,212,503 B1 * | 12/2015 | Mentch | ............... | A01G 9/22 |
| 2004/0003536 A1 * | 1/2004 | Stefan | ............... | A01G 9/1407 47/17 |
| 2007/0051054 A1 * | 3/2007 | Devincenzo | ............... | A01G 9/16 52/72 |
| 2011/0290433 A1 * | 12/2011 | Coenraets | ............... | A63C 9/12 160/311 |
| 2014/0157662 A1 * | 6/2014 | Wallace | ............... | A01G 9/241 47/17 |
| 2015/0121750 A1 * | 5/2015 | Looney | ............... | A01G 9/242 47/19.2 |
| 2017/0071139 A1 * | 3/2017 | Fence | ............... | A01G 9/227 |
| 2017/0086392 A1 * | 3/2017 | Van Deursen | ............... | A01G 9/242 |
| 2017/0238477 A1 * | 8/2017 | Lloyd | ............... | A01G 9/16 |

* cited by examiner

MODULAR ENCLOSURE WITH AUTOMATED CURTAIN DEPLOYMENT

CROSS-REFERENCE TO RELATED APPLICATIONS

This application is a continuation of U.S. patent application Ser. No. 15/374,855, filed Dec. 9, 2016, which claims priority and benefit under 35 U.S.C. § 119(e) to U.S. Provisional Patent Application No. 62/265,921, filed Dec. 10, 2015. The content of each of the foregoing applications is incorporated herein in its entirety by reference.

FIELD OF THE DISCLOSURE

This disclosure relates to a modular enclosure with automated curtain deployment.

BACKGROUND

Greenhouses and other enclosures of a temporary, permanent, or semi-permanent nature are known in the prior art. Such structures often have a rigid skeleton to which flexible sheeting material is attached so that an interior thereof is substantially isolated from a surrounding environment. The sheeting material is typically at least partially transparent to allow light to pass there through. Greenhouses are typically provided to extend a growing season or to provide a growing environment where plant growth factors, such as temperature and light, can be precisely controlled.

Similar enclosures are also provided for a variety of other purposes, limited only by the imagination. Such enclosures generally have a rigid skeleton of various elongate truss members and sheeting material placed over this skeleton to complete the enclosure. In some instances the sheeting material can be in the form of rigid panels or semi-rigid panels, as an alternative to flexible sheeting material.

One common general form for such enclosures is to have two opposite ends of the enclosure provided with flat end walls which are in parallel planes and which are spaced from each other by a length of the enclosure. A cross-sectional shape of the enclosure is matched by these two end walls. A length of such an enclosure can be variable with appropriate truss structures provided periodically between the two end walls. Sheeting material is then placed over an outer surface of this skeleton and optionally also over the end walls to enclose the enclosure from a surrounding environment. Typically, necessary penetrations into the enclosure, including doors, windows, vents, etc., are provided primarily in the end walls so that the sheeting material completing the enclosure does not require any penetrations there through. As an alternative, various other portals into the enclosure may be provided through this sheeting material and through the side walls. Such enclosures are thus beneficially modular, in that their length can be selected by a user and the end walls merely placed further or closer together to match the desired volume for the enclosure.

In some instances it is desirable to be able to control light flow into the enclosure, to selectively either allow light to pass into the enclosure or to block light from passing into the enclosure. One term for light blocking systems in greenhouses and other enclosures is "light deprivation systems." While it is known to suspend curtains within an interior of the enclosure as a form of light deprivation system, such curtain suspension systems inherently have multiple drawbacks. The present system takes many design flaws and gaps and solves for them with unique solutions to develop an entire operable system. They are difficult to position in a light occluding orientation and to return back to a stored orientation. Even when fully deployed, such curtain systems in the prior art typically do not occlude all of the light passing into the enclosure. Again, the lack of complete occlusion and durability makes the present system unique. Furthermore, the curtains in the prior art extend into an interior of the enclosure somewhat making it more difficult to fully utilize all of the space within the enclosure. Also, the process of deploying and retracting such prior art curtain systems is arduous and time consuming. Accordingly, a need exists for an enclosure, and especially a modular enclosure, which includes a light deprivation system that can be automatically deployed and fully occlude light when deployed, while also being easy to automatically return to a stored orientation when the curtains or other shade elements of the light deprivation system are not to be used.

SUMMARY

Some implementations according to the present technology relate to providing an enclosure system with automated light deprivation shade deployment and retraction. The system may include a plurality of trusses oriented parallel to each other and including at least a horizontal interior member with two diagonal members extending downwardly from ends thereof and two vertical members extending downwardly from the diagonal members on portions thereof opposite said horizontal member; a shade structure having a fixed edge fixed to one of the trusses and a leading edge; a leader arch coupled to the leading edge and including a horizontal bar extending between two or more diagonal bars at opposite ends thereof, and with vertical bars extending downwardly from the diagonal bars on portions of the diagonal bars opposite the horizontal bar; wires extending longitudinally between the truss members and along lines perpendicular to planes in which the truss members are oriented, and inboard of shade curtains; and a drive system configured to drive the leading edge from a first position closer to a fixed edge of the shade curtains to a second position closer to a deployed position for the shade structure, with the leader arch held at least partially guided by the wires upon which the leader arch rides as the leading edge moves.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

In some instances it is desirable to be able to control light flow into the enclosure, to selectively either allow light to pass into the enclosure or to block light from passing into the enclosure. One term for light blocking systems in greenhouses and other enclosures is "light deprivation systems." While it is known to suspend curtains within an interior of the enclosure as a form of light deprivation system, such curtain suspension systems inherently have multiple drawbacks. The present technology solves these problems. In some implementations, the present system takes many design flaws and gaps and solves for them with unique solutions to develop an entire operable system. Curtain systems in the prior art are difficult to position in a light occluding orientation and to return back to a stored orientation. Even when fully deployed, such curtain systems in the prior art typically do not occlude all of the light passing into the enclosure. Again the lack of complete occlusion and durability makes the present system unique. Furthermore, the curtains in the prior art extend into an interior of the enclosure somewhat making it more difficult to fully utilize all of the space within the enclosure. Also, the process of deploying and retracting such prior art curtain systems is arduous and time consuming. Accordingly, a need exists for an enclosure, and especially a modular enclosure, which includes a light deprivation system that can be automatically deployed and fully occlude light when deployed, while also being easy to automatically return to a stored orientation when the curtains or other shade elements of the light deprivation system are not to be used.

In some implementations according to the present technology, an enclosure is provided that can be made modular and that includes a light deprivation system. The light deprivation system may be automatically transitioned from a stored configuration to a deployed configuration. In the stored configuration, the light deprivation curtains may be placed substantially entirely out of view (or entirely out of view) and in a non-light blocking position. In the deployed configuration, light may be caused to be entirely (or at least substantially entirely) blocked from passing into an interior of the enclosure. The light deprivation curtains may be added to a greenhouse after construction or during the original construction. It is noteworthy that the ability for the system to be modular and easily added to existing structures or new structures is unique.

Figure 1:
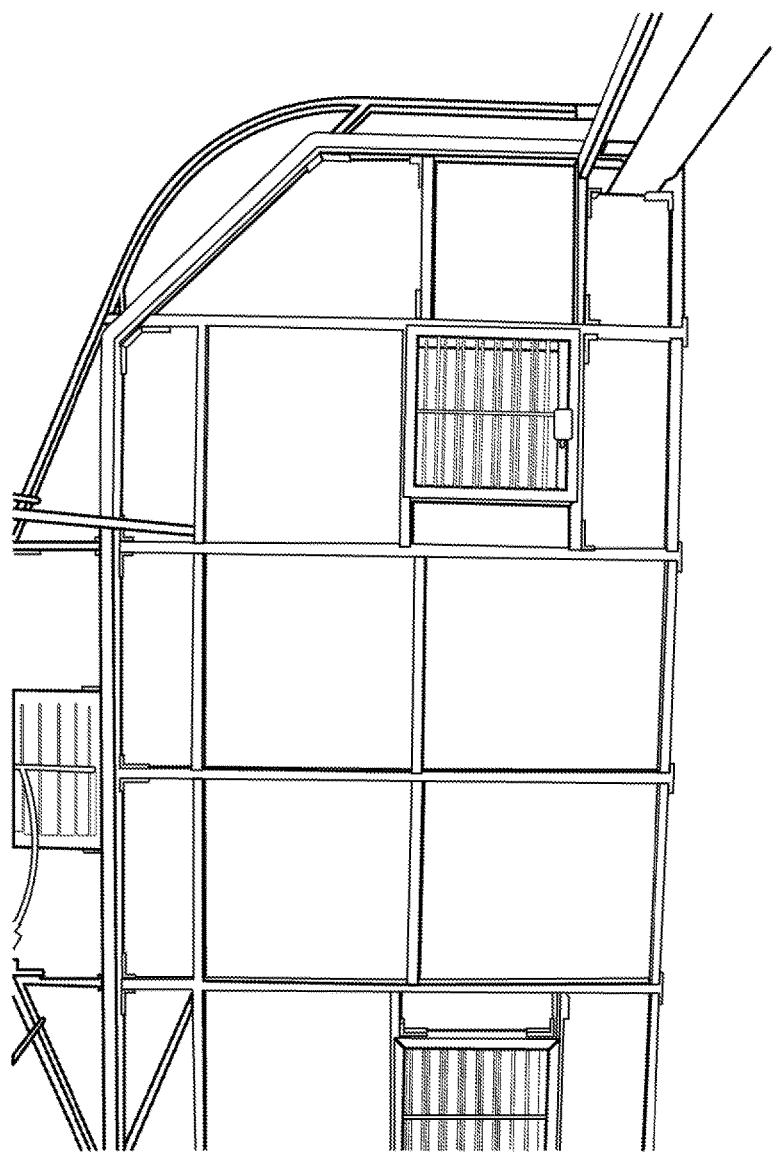
FIG. 1 illustrates an inside of an end wall of a greenhouse, in accordance with one or more implementations.
Figure 2:
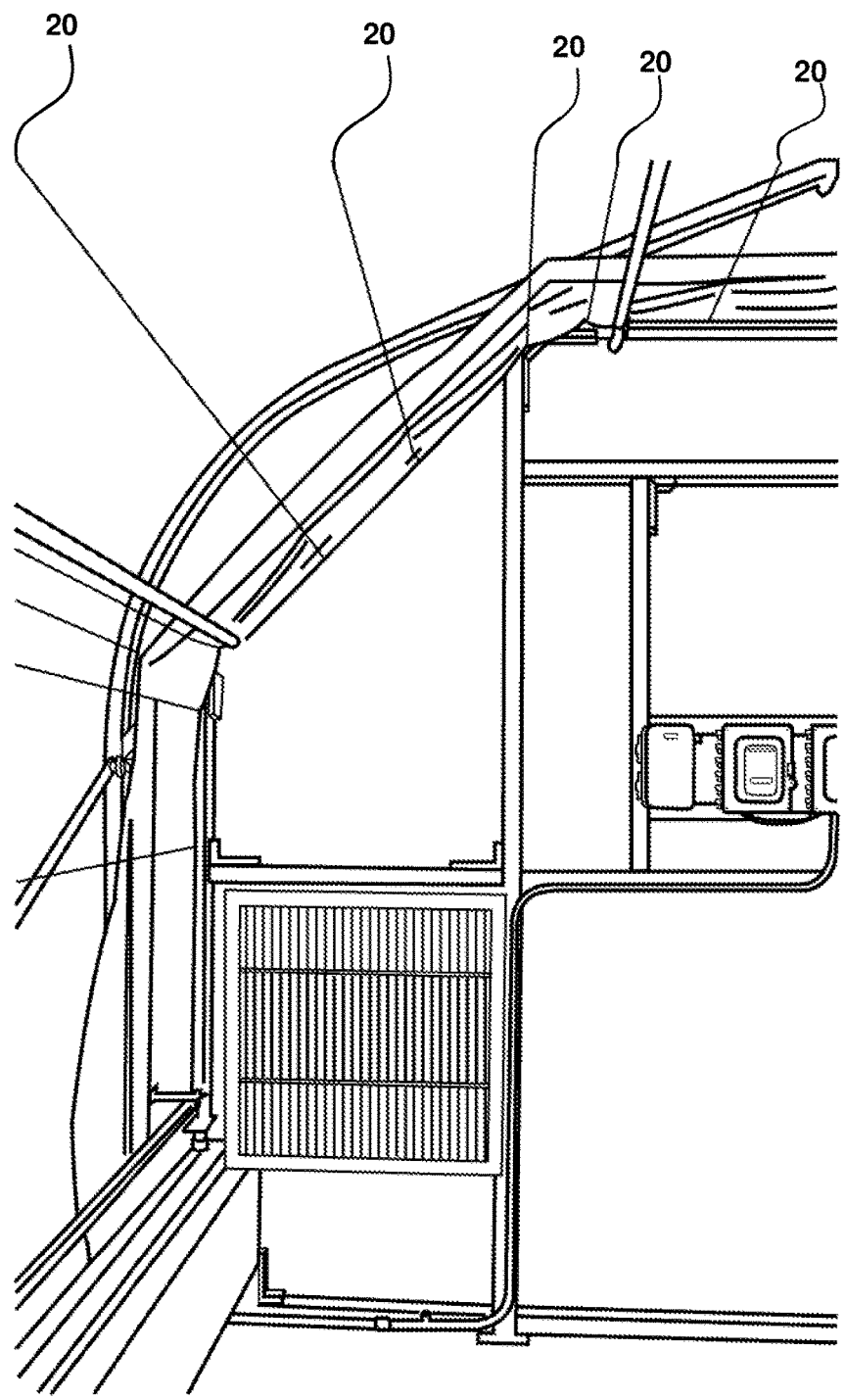
FIG. 2 an inside of an end wall of a greenhouse, in accordance with one or more implementations.

In some implementations, the enclosure includes a skeleton generally characterized by two end walls (See FIGS. 1 and 2) and intermediate trusses. The two end walls are generally planar and define a cross-sectional shape of the enclosure. Doors, vents, windows, and other portals into the enclosure are concentrated in such end walls in a configuration suiting the needs of a user. The light trap housing supports the light trap and secures it to the fan and/or louver. When the system is closed the light trap housing is used to suspend a light trap over areas such as wall fans and louvers to keep light either in or out of the greenhouse. In some implementations, the intermediate trusses may have a shape generally matching an outline of the end walls and may be placed at intermediate positions between the two end walls.

In some implementations, the intermediate trusses may be connected to the end walls. This may be accomplished by the use of longitudinal members that control a spacing of the intermediate trusses from each other and away from the end walls, typically with the intermediate trusses each parallel with each other and parallel with the end walls. Typically, these longitudinal members are provided on upper portions of the enclosure skeleton and also typically near a foundation at lower portions of the intermediate trusses and the end walls of the enclosure skeleton.

Figure 3:
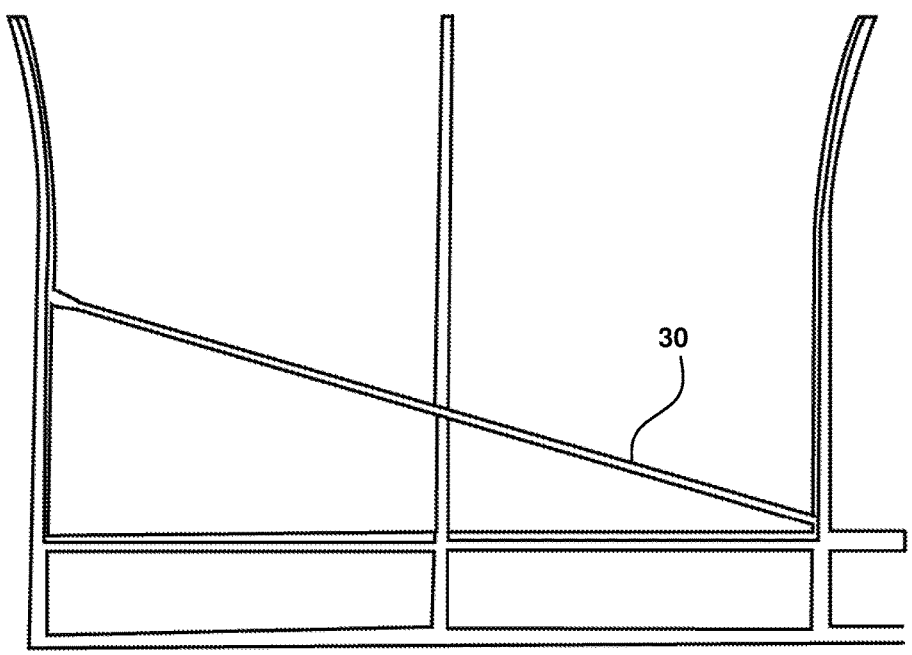
FIG. 3 illustrates a wind brace, in accordance with one or more implementations.

In some implementations, shear elements may be provided to cause the enclosure to have resistance to shear forces that might cause the end walls and intermediate trusses to tend to want to collapse, somewhat like the sequential collapsing of dominoes which have been erected upright on a horizontal surface. Such shear is particularly important when outer sheeting material is of a flexible and/or low strength nature, rather than formed of rigid or semi-rigid panels. Typically, such shear members (see wind brace 30 of FIG. 3) may be provided near four corners of the enclosure and may be rigid members and/or cables.

Figure 4:
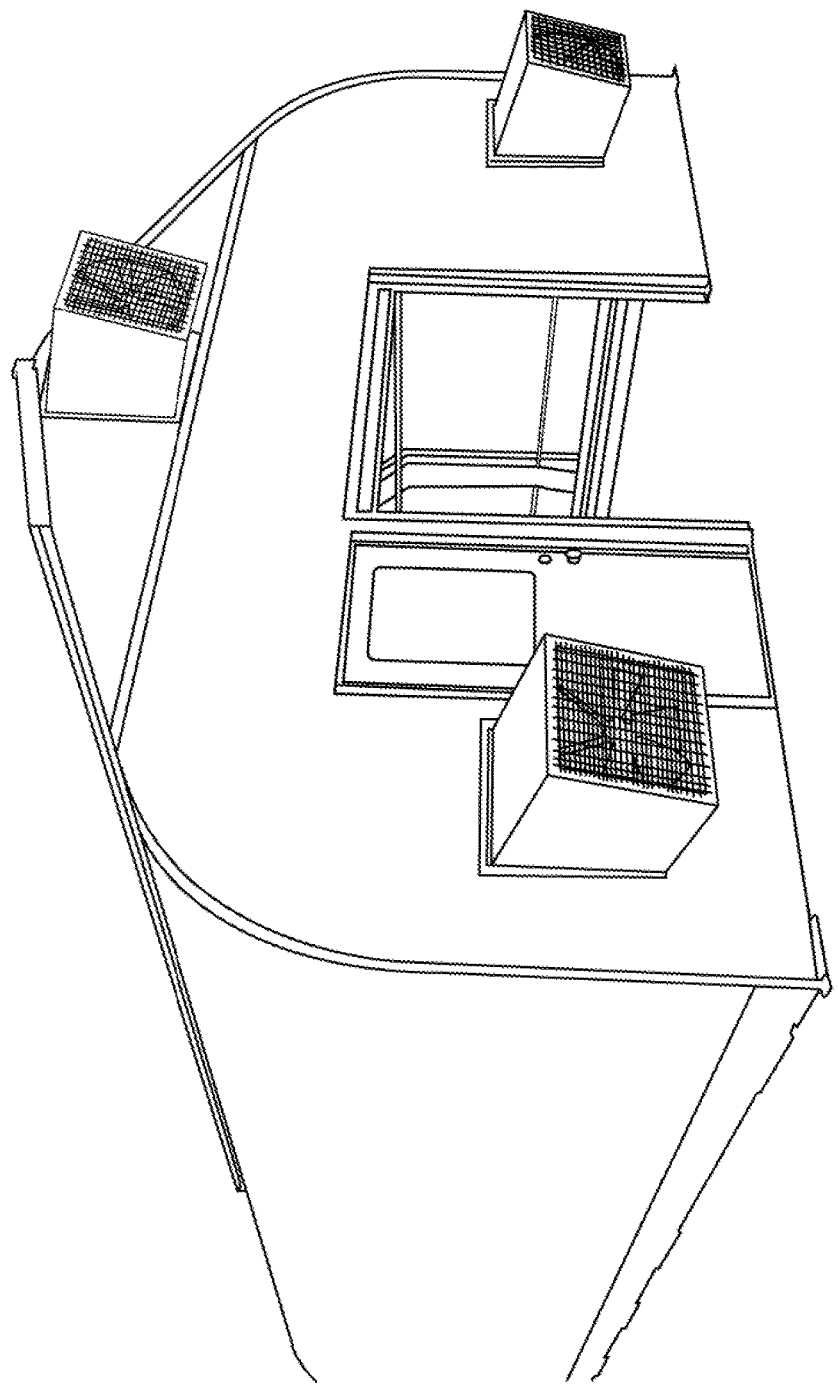
FIG. 4 illustrates an outside of the greenhouse, in accordance with one or more implementations.
Figure 5:
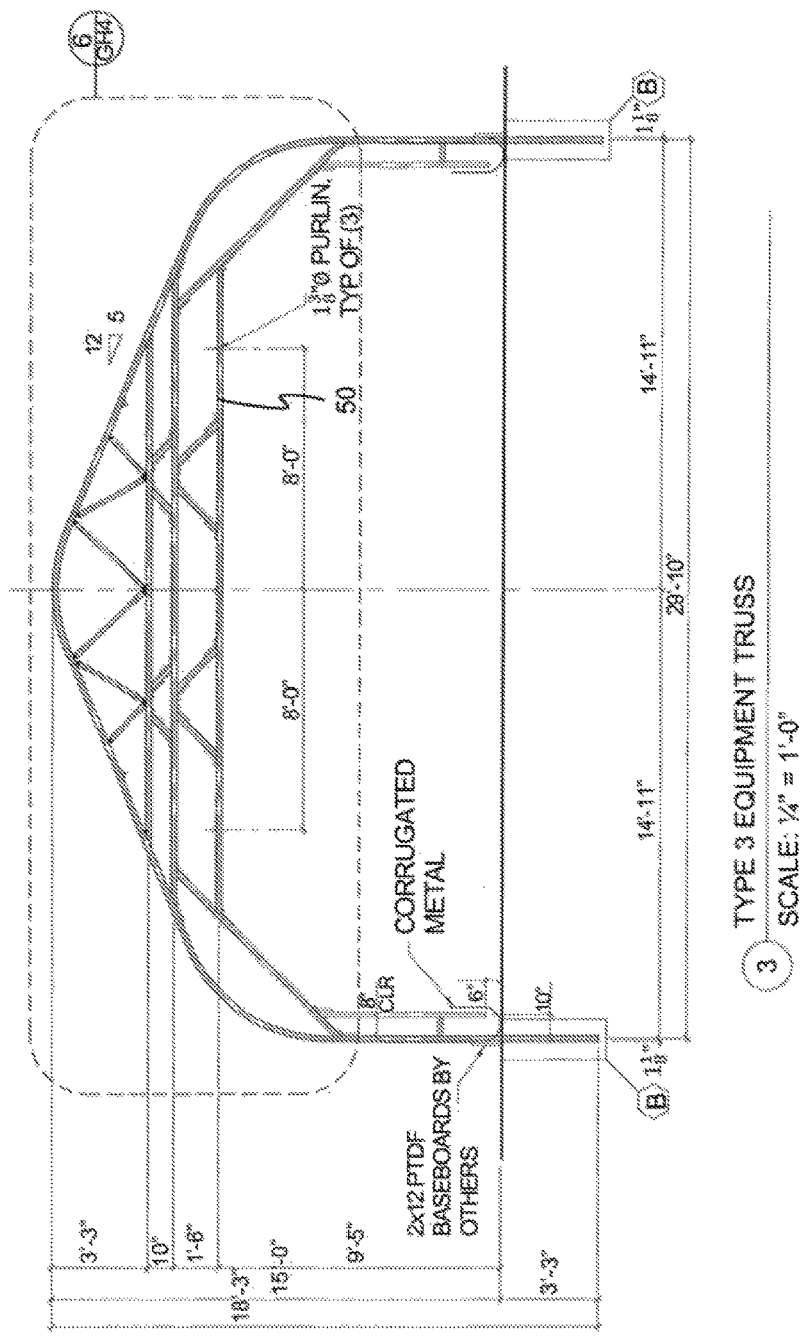
FIGS. 5-7 illustrate a schematic of the greenhouse, in accordance with one or more implementations.
Figure 6:
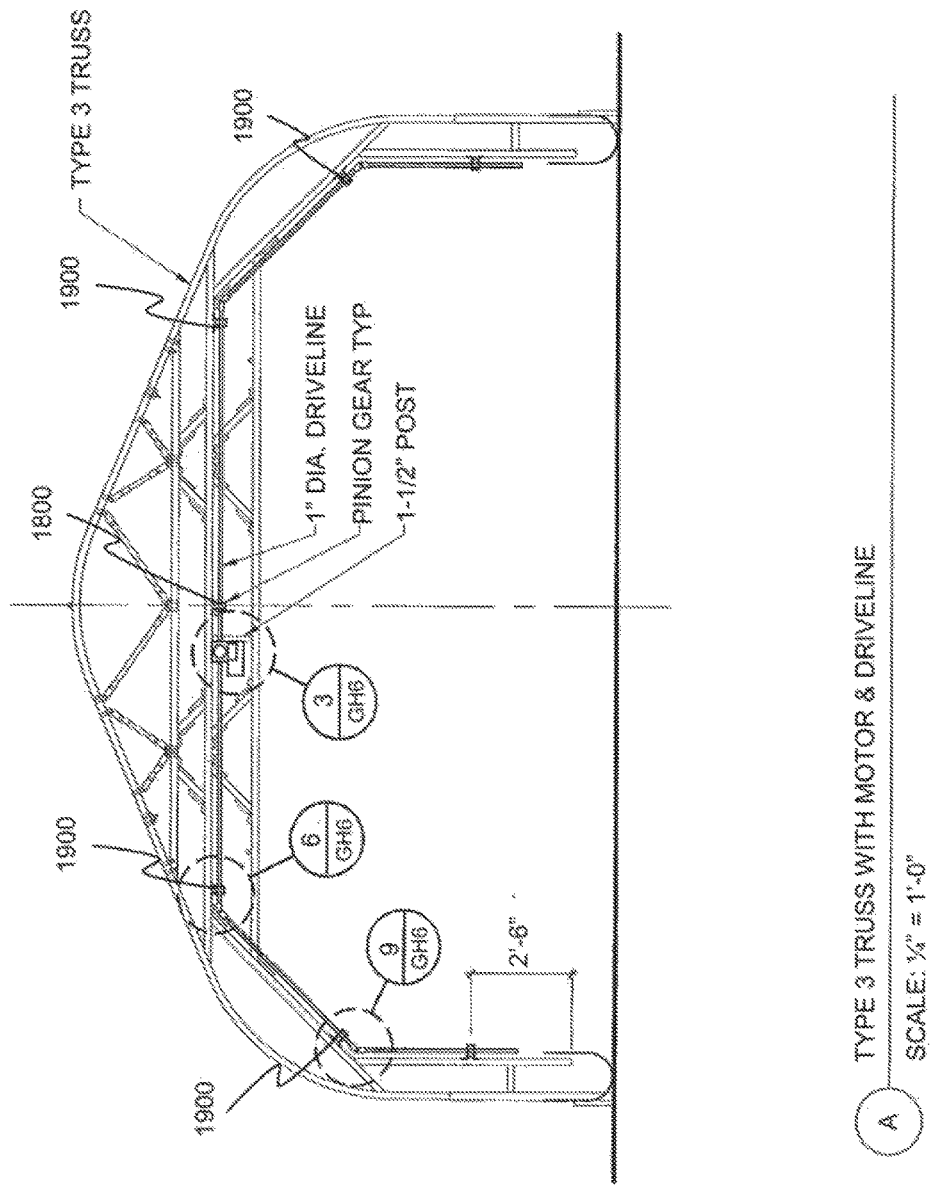

To allow the enclosure to have a modular form, the intermediate trusses are preferably provided in a repeating pattern. In this particular embodiment, which also facilitates the automatic light deprivation curtain deployment system, two main types of trusses are provided including an intermediate truss which only includes outer structural truss members and roller trusses which include both outermost members and inner shade deployment system supporting members within a common plane. In the embodiment depicted, modular sections which are twelve feet long are provided. The overall enclosure depicted herein (see FIG. 4) may be thirty-six feet long (or any other suitable length) so that three modular sections may be provided between the two end walls. Many sizes and varieties are contemplated, but the underlying operation may be the same. Referring to FIG. 5, in some implementations, each modular section (or a plurality thereof) may include one (or more) simple intermediate truss 50 and one (or more) light deprivation curtain deployment system supporting roller truss. The complex roller truss may be located at an end of the modular section, with the simple intermediate truss located at a midpoint of the modular section. Thus, the modular section may be placed adjacent to an end wall which also has a more complex and strengthened form, so that each modular section has more complex truss elements at ends thereof (provided by a wall or a roller truss) and with a simple intermediate truss at a midpoint thereof (see FIG. 6).

If the modular section is adjacent to another modular section, the more complex roller truss of a first modular section may be located at a transition point between the first modular section and a second modular section. The second modular section may have a more complex roller truss at an end thereof opposite the first modular section, enabling it to provide a more complex truss at a transition between the second modular section and a third modular section. Because each end wall may function to support the light deprivation system, and otherwise provide the function of the more complex roller truss element, it is conceivable that one of the modular sections may be provided without any more complex roller truss element because it is positioned between another modular section which does have a more complex roller truss and an end wall.

Figure 7:
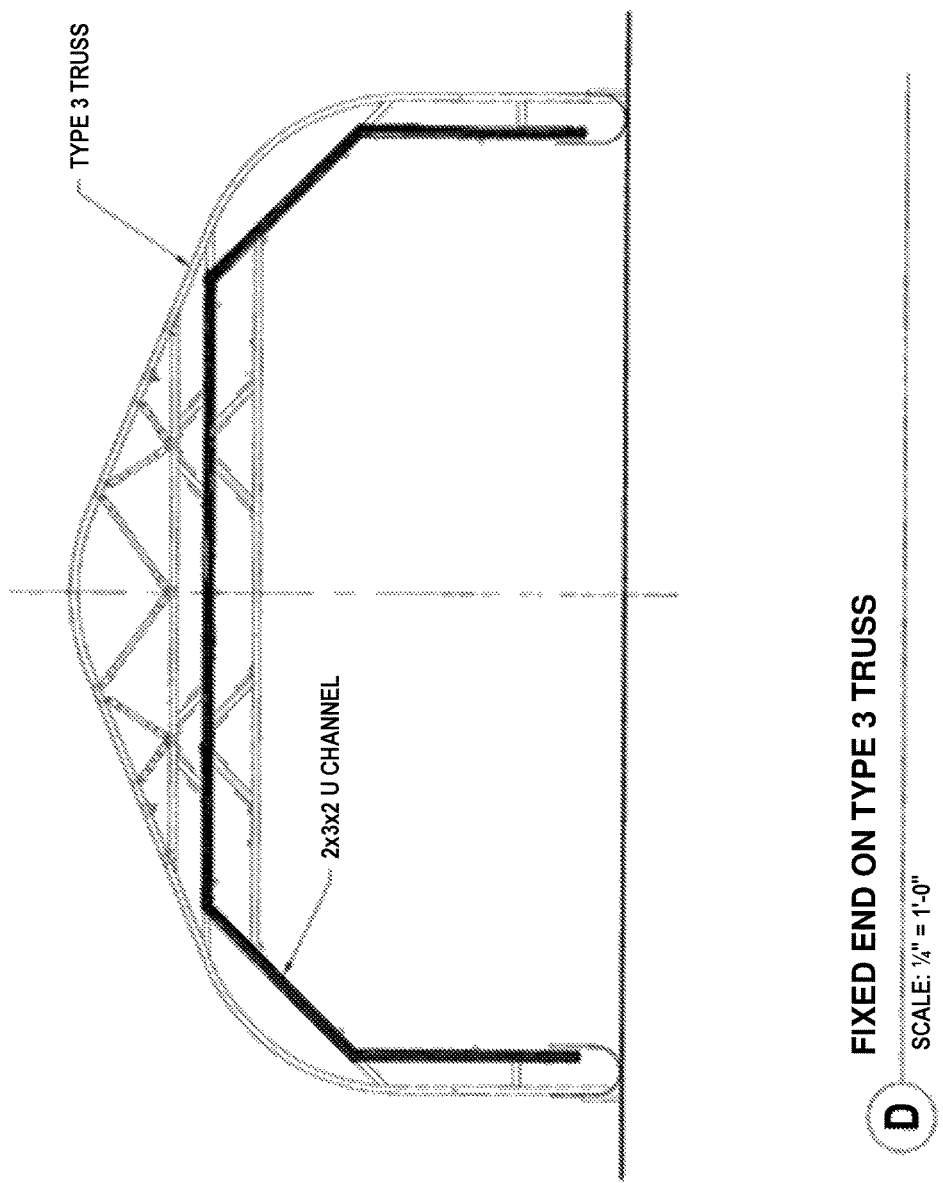

Referring to FIG. 7, the roller trusses each (or a plurality thereof) include interior truss members below outer truss members that extend somewhat into an interior of the enclosure. In some implementations, these interior truss members may be configured to include two (or another number of) vertical truss members on either side of the enclosure, connected to two diagonal members that extend at a 45 degree (or any other suitable degree) angle upwardly and toward each other from each side of the enclosure, and a horizontal inner truss member that extends between the two diagonal truss members to join them together and spanning a width and distance between the two diagonal truss members' upper ends. A ceiling truss member (see FIGS. 6, 8, and 19) is preferably provided parallel to the horizontal truss member and extending somewhat below the horizontal truss member, providing support for lights, fans, ceiling panels, and/or other ceiling accessories and/or details. Stabilizing truss members may be provided between the ceiling truss member and the horizontal truss member to add further rigidity to this more complex roller truss.

Figure 8:
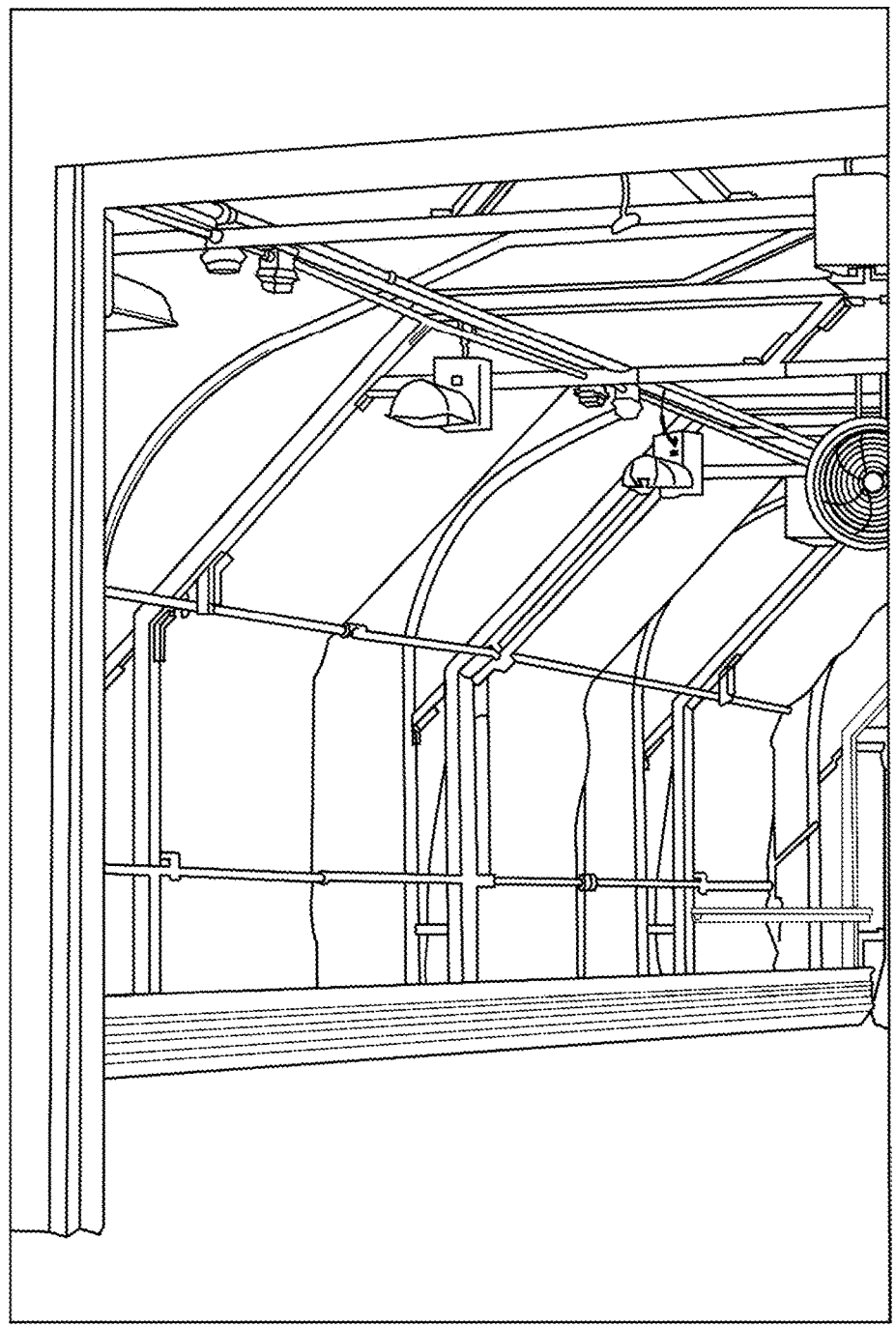
FIG. 8 illustrates curtains of the greenhouse, in accordance with one or more implementations.
Figure 9:
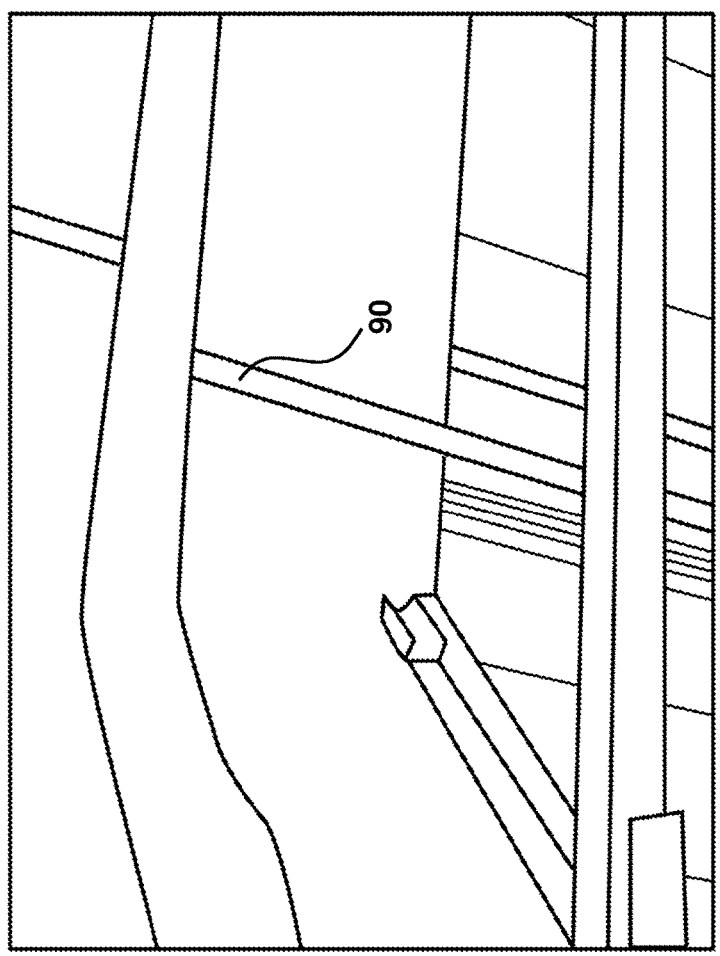
FIG. 9 illustrates a curtain of the greenhouse in a full open configuration with a roller bracket, in accordance with one or more implementations.

Referring to FIG. 8, importantly, in some implementations, the shade curtains of the light deprivation system do not extend past or through these more complex roller trusses. Rather, they may be stored adjacent to one roller truss when in a stored configuration, and extend away from this roller truss element when being deployed, spanning an entire distance of each modular section and nesting into closure troughs at the next roller truss (in some implementations twelve feet away from the roller truss to which the curtain is confined when in its stored configuration). Referring to FIG. 9, a curtain fully open with a roller bracket 90 (roller truss) is depicted.

Figure 10:
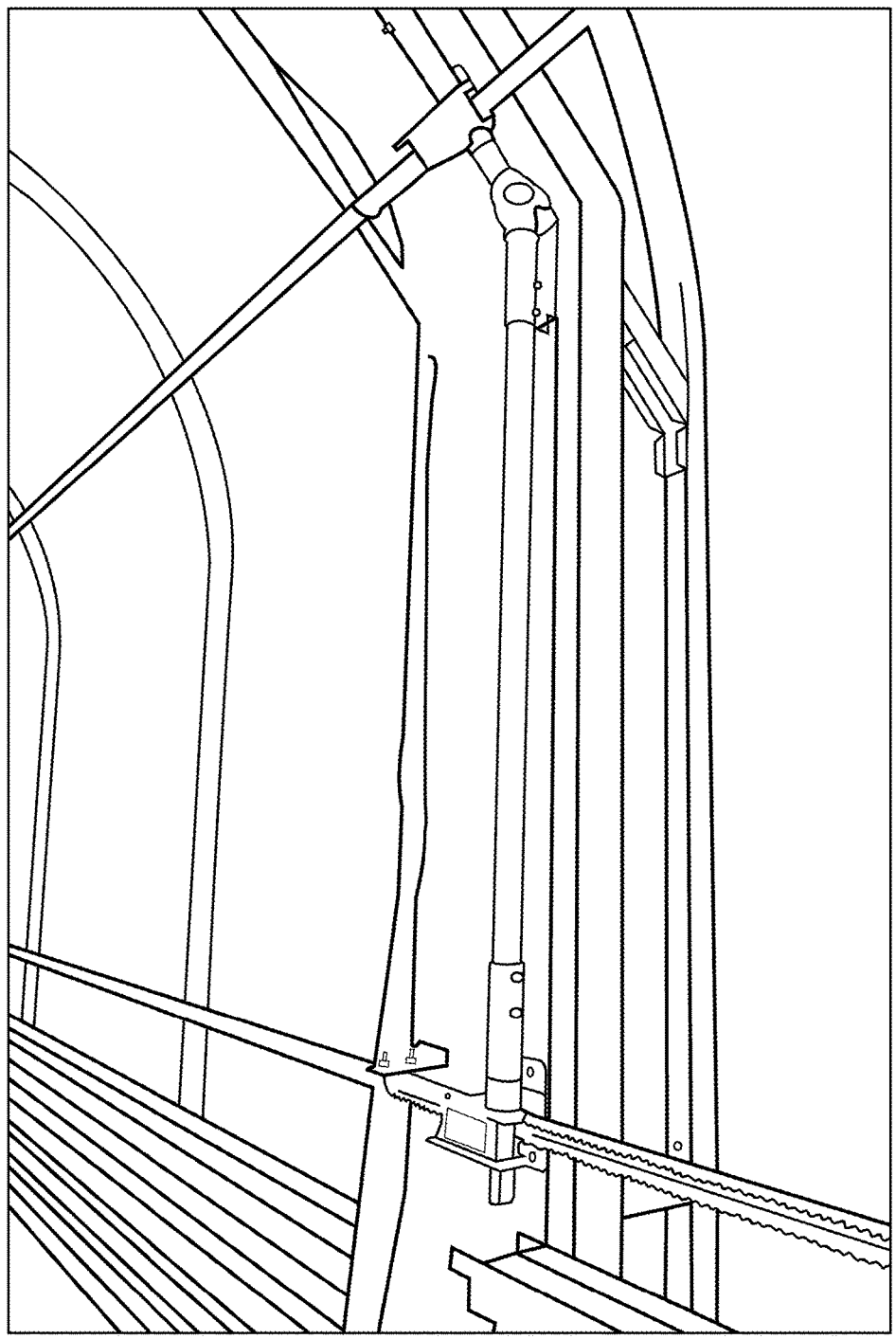
FIG. 10 illustrates a curtain that is collapsed into a stored configuration, in accordance with one or more implementations.

Referring to FIG. 10, in some implementations, each (or a plurality of) modular section(s) has its own curtain element that can be collapsed into a stored configuration that takes up only a very small amount of space (less than a foot in some implementations, but a foot or greater is contemplated). A plurality of the modular sections may be expanded into a deployed configuration that spans the twelve-foot (or other distance) section. The curtains may be formed from a fabric that has an entire blackout ability so that no light penetrates there through. If desired, the curtain may include other attributes, such as a reflective outer surface to reflect away radiant energy and multi-layer insulative properties. The curtains may be inboard of the outer skeletal members of the intermediate trusses and the roller trusses and thus provide a second layer of the enclosure inboard of the outer sheeting material on the enclosure. Thus, further insulation for the enclosure may be facilitated when the curtains are in their deployed configuration.

Figure 11:
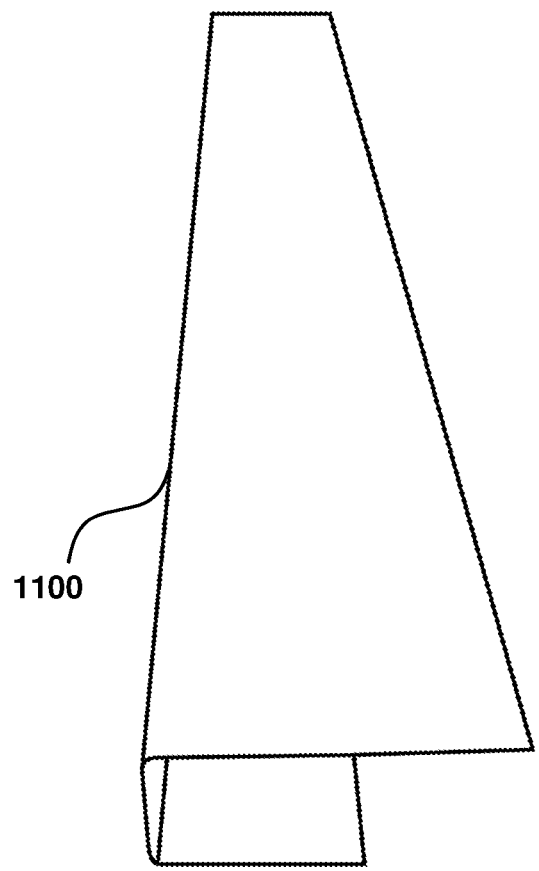
FIGS. 11-12 illustrate a leading edge, in accordance with one or more implementations.
Figure 12:
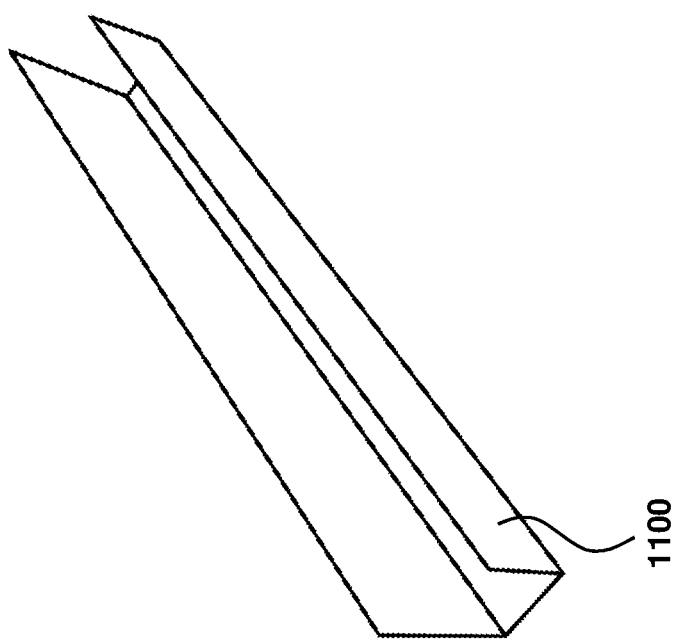
Figure 13:
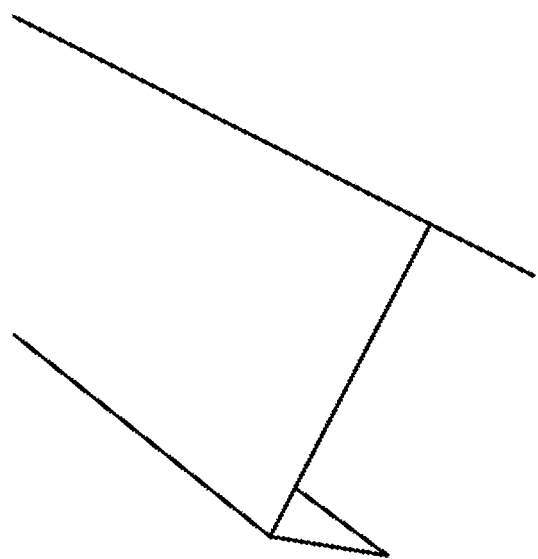
FIG. 13 illustrates a fixed edge, in accordance with one or more implementations.

In some implementations, each (or a plurality of) curtain sections have a stationary edge (see FIG. 10) and a leading (or lead or movable) edge. Referring to FIGS. 11 and 12, leading edge 1100 is depicted. Referring to FIG. 13, a fixed (or stationary) edge (C-channel) is depicted. When in the stored configuration, the fixed edge and leading edge have been collapsed to being substantially adjacent to each other, with intermediate portions of the curtains packed there between. The stationary edges of the curtain elements remain affixed to a roller truss. The movable edges of the curtain sections move from the stored configuration to the deployed configuration from a first roller truss to a second roller truss. A drive system is preferably provided to move leading edge 1100 of the curtain from the stored position to the fully deployed position. The space the curtain takes up when stored both in length and width is quite unique.

A first element of this drive system for the curtains includes a rigid leader arch. The rigid leader arch may have a shape matching that of the inner members of the roller truss, including the vertical members, diagonal members, and horizontal members. This leader arch thus includes two vertical bar portions at opposite sides of the enclosure, two diagonal bar portions coupled to the upper ends of the vertical bar portions and extending upwardly and inwardly toward each other away from the vertical bar sections, followed by a horizontal bar section which joins upper ends of the diagonal bar sections together.

This rigid leader arch moves with the movable edge of the curtain to move the curtain from the stored configuration to the deployed configuration. While it is conceivable that the leader arch could be moved manually, such as by a user grasping the leader arch or a handle attached to the leader arch and walking the leader arch from the curtain storage location to the curtain deployed location, most preferably an automated drive system is provided. This drive system also acts to support the leader arches above ground by suspending them from portions of the roller trusses.

Figure 14:
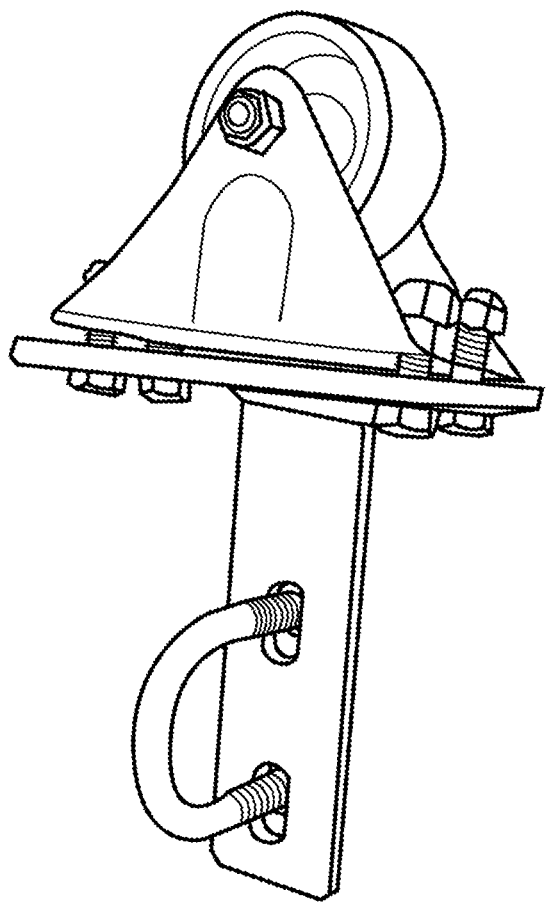
FIG. 14 illustrates a wheel assembly, in accordance with one or more implementations.
Figure 15:
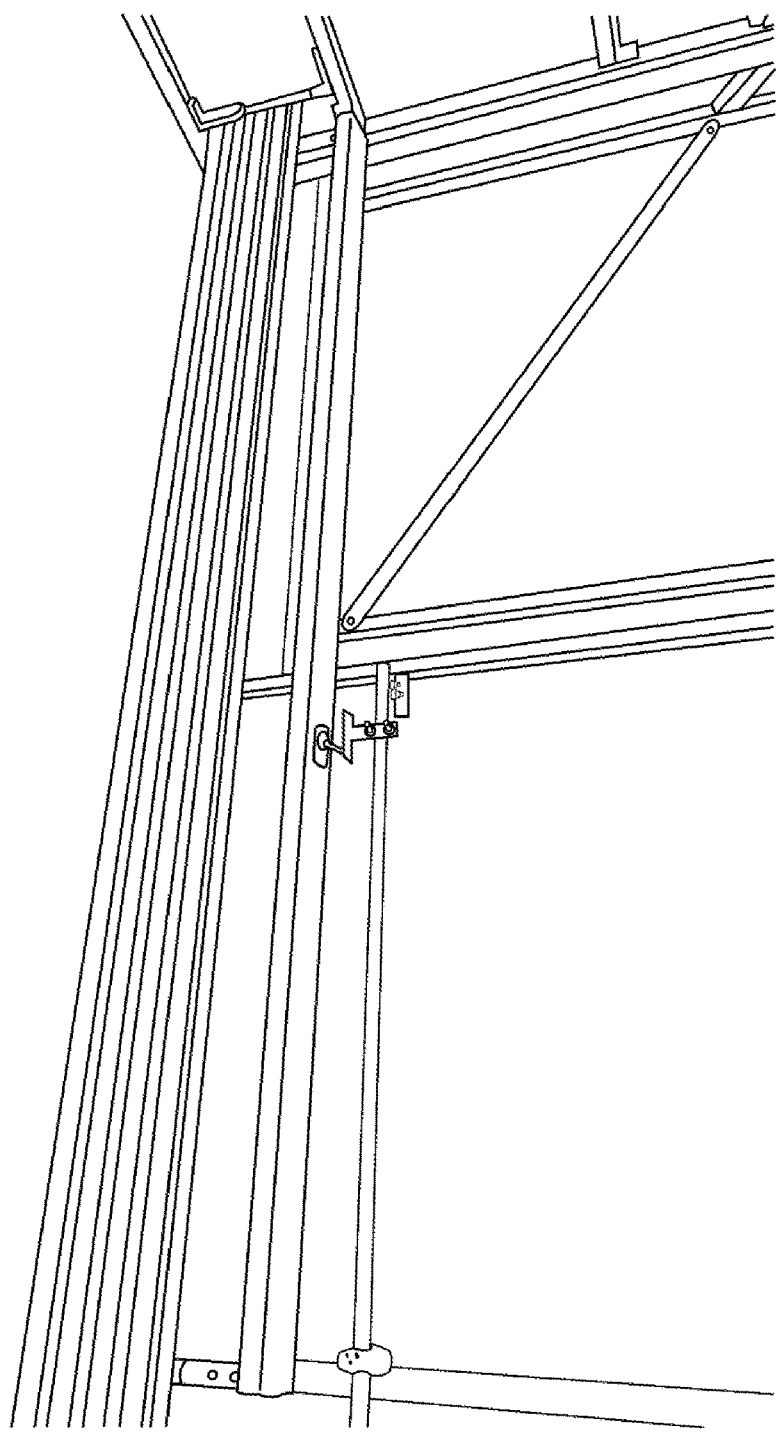
FIG. 15 illustrates a wheel support track, a U-shaped gutter system, and a four-corner wheel assembly, in accordance with one or more implementations.

Referring to FIG. 14, a wheel assembly is depicted. Referring to FIG. 15, a wheel support track, a U-shaped gutter system, and a four-corner wheel assembly are depicted. Additionally, and preferably at least near the end walls of the enclosure, wheeled supports are provided that roll on horizontal longitudinal tracks just inboard of the roller trusses. In this manner, at least the leader arches closest to the end walls of the enclosure are both supported from above by portions of the drive mechanism coupled to rollers suspended just below the inner portions of the roller truss, but also are supported from below by the wheeled supports riding in the tracks.

This dual roller system and the design of the roller advantageously improves the durability of the system. Nearly every other system uses a hanging roller rather than a dual supported roller. The wheel track assembly enables both durability and complete black out. In some implementations, it works with one wheel assembly in each corner of the light deprivation system. When the system is open the weight is pushed onto the wheels at the rear of the greenhouse. But when the curtain is closed the weight is distributed onto the wheels at the front of the system. This equal distribution is unique. Furthermore, longitudinal wires, also referred to as Atlas wires 20 (see FIG. 2) extend longitudinally at regular intervals along vertical members, diagonal members, and the horizontal members of the roller trusses.

Figure 16:
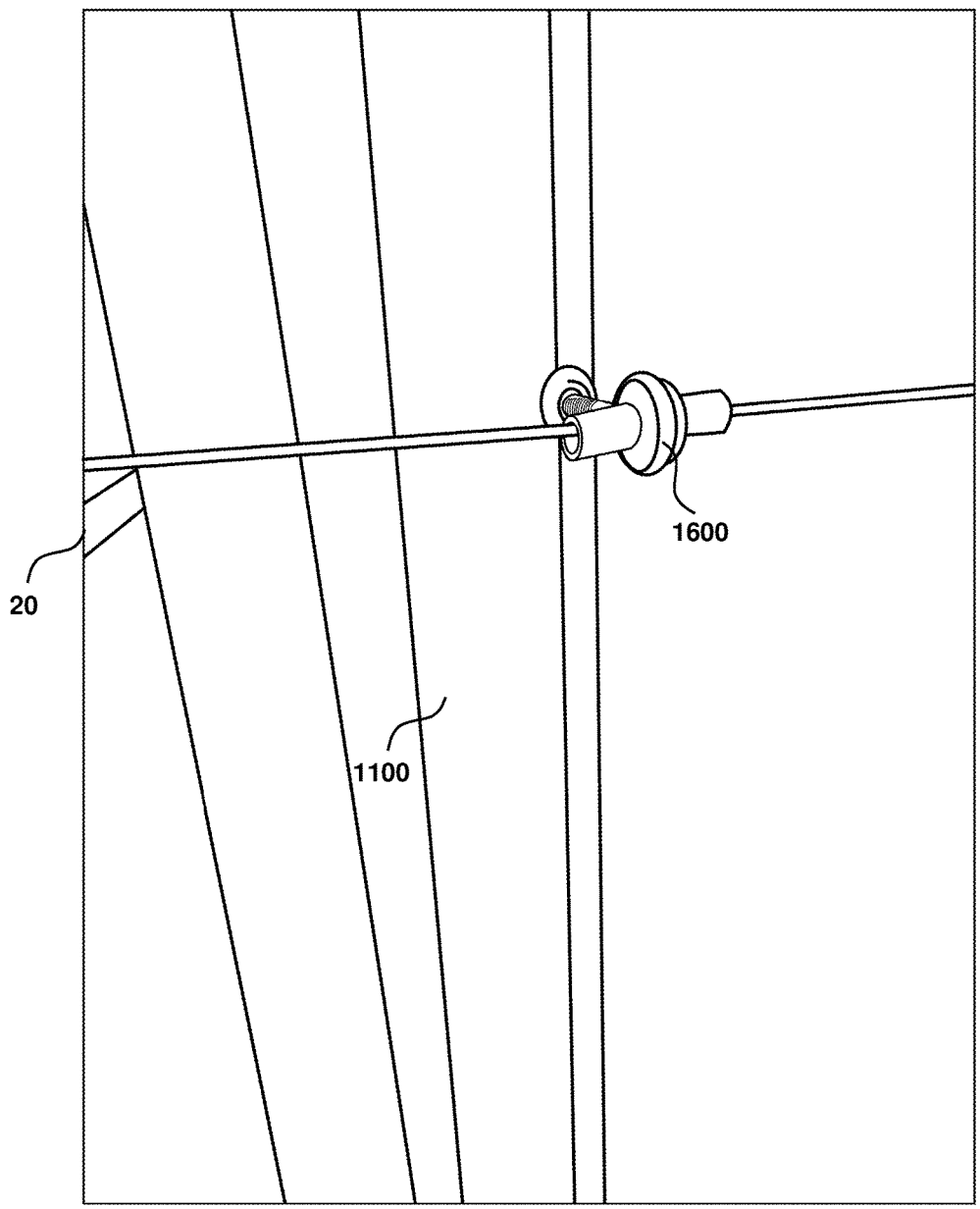
FIG. 16 illustrates an eye bolt connection, in accordance with one or more implementations.

Referring to FIG. 16, these Atlas wires are fixed to the inner portions of the roller trusses. Eye bolts 1600 with appropriate bearing sleeves thereon ride on these wires with the eye bolts connected to the leader arches. Thus, the leader arches maintain their parallel orientation perpendicular to the wires and perpendicular to any other longitudinal support structures within the enclosure, through support by the wheels, wires, and drive elements carried on rollers suspended from the roller trusses. An area is shown where eye bolt 1600 may be located. Eye bolt 1600 is a completely unique design element. Eye bolts 1600 advantageously provide less friction than alternatives. The combination of the individual components is unique.

Figure 17:
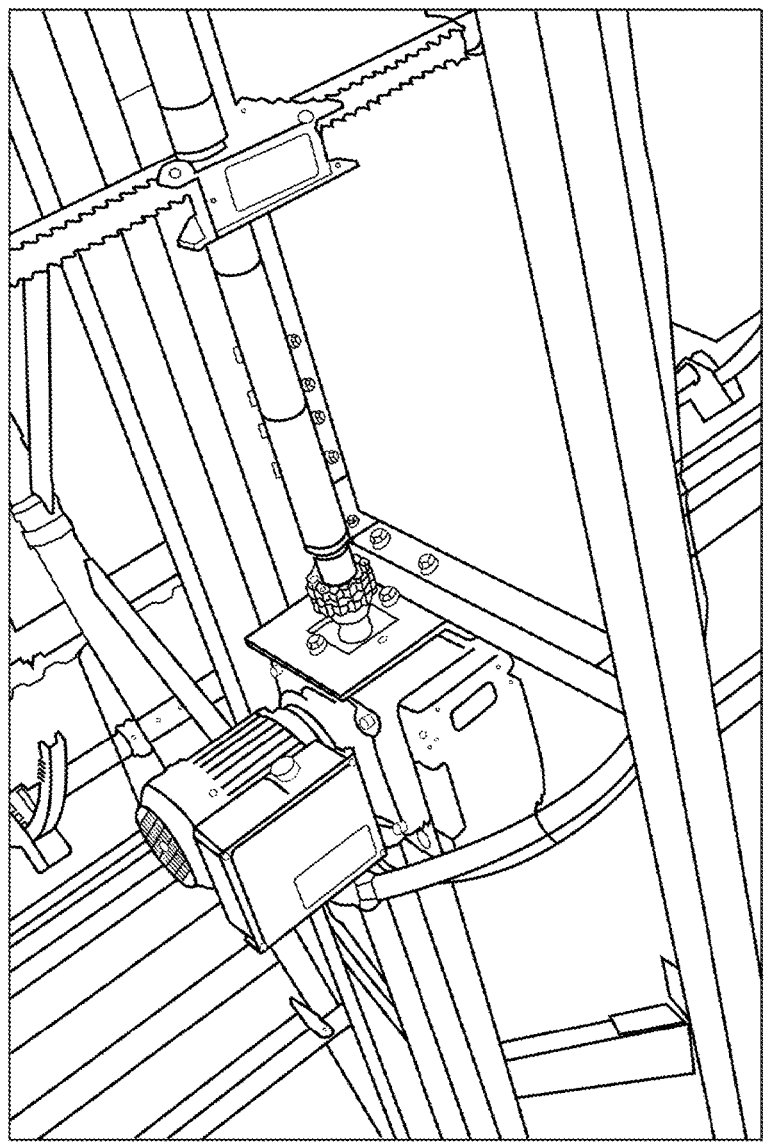
FIG. 17 illustrates a drive system, in accordance with one or more implementations.

Referring to FIG. 17, in some implementations, a drive system is provided that causes the leader arches to move from a start position where the curtain is in a stored configuration to a finish position where the leader arches have fully deployed the curtains to their deployed configurations. An electric motor with an output shaft may be geared appropriately to transmit power to a driveline shaft. In some implementations, the driveline may extend horizontally from the motor in two directions with the motor mounted at (or near) a center of the horizontal member of the roller truss spaced from one of the end walls. The drive line extends horizontally adjacent to one of the roller trusses that carries the motor and the drive bar in a manner allowing the drive bar to rotate about a horizontal axis parallel to the horizontal member of the roller truss.

Figure 18:
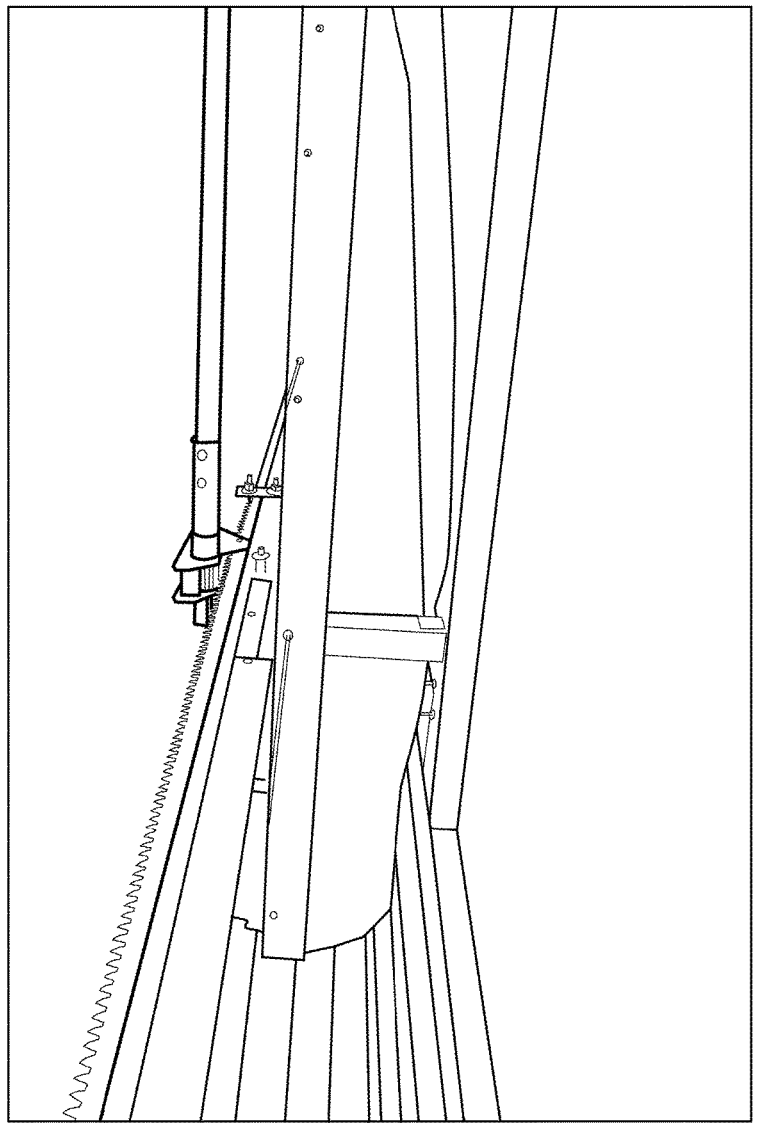
FIG. 18 illustrates a driveline, in accordance with one or more implementations.

In some implementations, referring to FIG. 18, pinion gears 1800 (see also FIG. 6) are mounted to the driveline at appropriate locations aligned with rack gear bars. These rack gear bars are in turn fixed to the leader arch. The rack gear bar may be further connected longitudinally to drive poles that further extend a length of the rack gears and connect to sequential leader arches for successive modular sections of the overall enclosure. For instance, in the figures there is included a three-module enclosure with three twelve-foot sections. One approximately twelve-foot rack gear bar is provided, followed by two approximately twelve foot drive bars, all co-linear in some implementations.

Referring to FIG. 10, one of the leader arches may be coupled to the rack gear bar, while the other two leader arches may be coupled to drive poles spaced longitudinally in line with the rack gear bar, each leader arch holding a leading edge of a curtain for each modular section. Thus, the one motor and driveline effectively drive each (or a plurality) of the leader arches for each of the modular sections, so that the curtains associated with each (or a plurality of) modular sections are closed simultaneously.

In some implementations, three (or any other suitable number of) pinion gears may be provided on the drive line horizontal section, with one being located at a center of the enclosure, and one being located at upper corners of the enclosure where the horizontal truss members transition to the diagonal truss members. Two additional rack gear bars and associated pinion gears may be provided at the transition between the lower portions of the diagonal members of the roller truss and the upper ends of the vertical members of the roller truss. Pinion gears and rack gear bars may be provided near lower ends of the vertical members of the roller truss. Thus, in some implementations, seven (or any other suitable number of) different locations may be provided where pinion gears and rack gear bars interface together and connect to leader arches to appropriately drive the leader arches and cause the shade curtains to be effectively deployed or retracted. The amount, location, and quality of the rack and pinion system are all unique to the design. Prior systems use a push and pull system instead of the advantageous multiple rack and pinion system according to the present technology.

Figure 19:
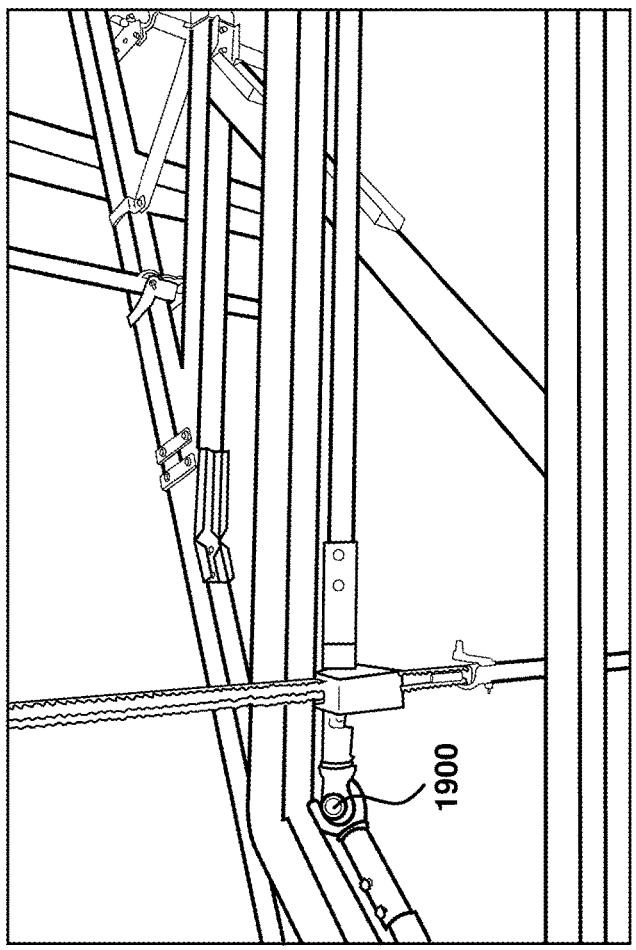
FIG. 19 illustrates a double U-joint, in accordance with one or more implementations.

Referring to FIG. 19, in some implementations, the driveline may extend to the lateral edges of the horizontal truss member, and then transition through universal joints 1900 (see FIG. 6) (such as two universal joints—double U-joints) at each end thereof by 45 degrees (or any other suitable angle) to extend as diagonal drivelines parallel with the diagonal members of the roller truss. These double universal joints are a complete design very unique. The design of the double "U joint" allows for the geometry of the structure giving it a much tighter angle to function, increased stability and an even flow to open and close the curtain.

In some implementations, another universal joint may be provided to connect the diagonal drive lines to vertical drive lines extending down to lower ends that are supported by bearing support elements (or free ends may be implemented). Thus, when the drive motor drives the horizontal driveline, the diagonal drivelines may also be caused to rotate as well as the vertical drivelines. The various pinion gears on the vertical drivelines, diagonal drivelines, and horizontal drivelines each interact with different ones of the rack gear bars to cause them to move, and in turn longitudinal drive poles fixed co-linearly in line with the rack gear bars also are caused to move. In this manner, leader arches coupled to this drive assembly are caused to move as well.

In some implementations, the motor may operate in a forward direction for deployment of the shade structures (light deprivation curtains). In some implementations, the motor may operate in a reverse direction to retract the shade structures (light deprivation curtains). The longitudinal wires that assist in keeping the leader arches aligned also assist in keeping the shade curtains from drooping down from the ceiling or down inwardly from the diagonal members of the inner portions of the roller trusses. The wires also keep the shade structure from migrating inboard of the vertical side walls. Gravity tends to keep the shade structures confined within a generally planar space at the side walls. However, to further keep the shade structures confined, a U-shaped channel may be provided at a lower edge of the shade curtains. (See FIG. 15). The shade curtains may extend down into this U-shaped channel and keep the lower edges of the shade curtains aligned generally within a plane parallel with outside walls of the enclosure. The U-shaped channel may also act as a light trap preventing light from migrating beneath a lower edge of the curtains, so that substantially full darkness is maintained within the enclosure. This U-shaped channel is another very specific and unique design. In some implementations, the U-shaped channel is not used as support, but rather for facilitating gathering of the curtain and to facilitate blackout and prevent snags of the curtain, as well as maximize space in the structure and protect the curtain.

In some implementations, when the leader arches have extended fully to the deployed position, they nest into C-shaped channels which also act as a light trap to prevent light from leaking around the leader arches and into an interior of the enclosure. Similarly, stationary edges of the shade curtains are attached in such a manner that when the shade curtain segments are fully deployed, the fixed edges thereof do not have any gaps for light to pass into the enclosure. Thus, when the various curtains of the modular sections of the enclosure have been transitioned from their stored configuration to their deployed configuration, the interior of the enclosure has been fully blacked out. The C-channel meeting a fixed edge is advantageous and unique. Past attempts used a rubber gasket or extrusions using a gusset closure. Instead, by using a fixed edge nesting into the C-channel you there is a junction with complete blackout. The junction and nesting is completely unique in operation and design.

In some implementations, the motor and associated drive system may automatically cause the shade curtains to both transition from the stored configuration to the deployed configuration and to return the shade curtains from the deployed configuration back to the stored configuration. If desired, the shade curtains may be stopped at some intermediate point between the stored configuration and the deployed configuration, so that an amount of light provided into the enclosure can be controlled. A controller for the motor driving the entire automatic light deprivation system can be configured to operate on a timer so that light is provided during portions of the day and deprived during portions of the day, at the control of a programmer of the controller. Additionally the shade curtain automation may be set with solar sensors to ensure proper quantity and quality of light enters the structure.

Figure 20:
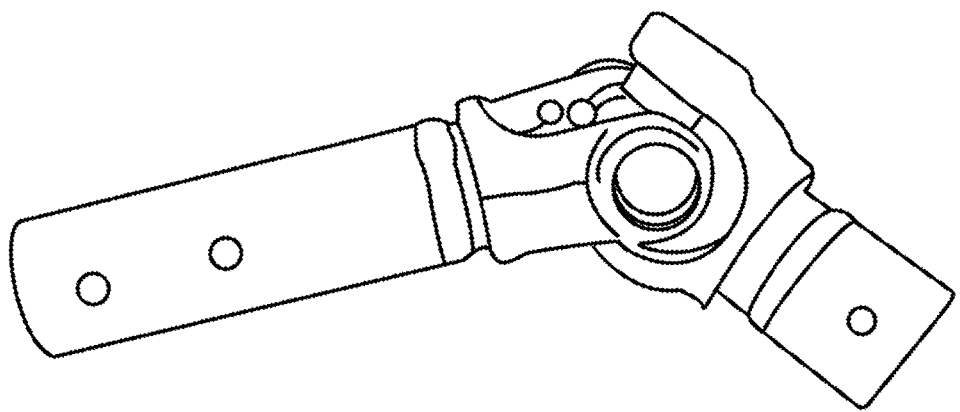
FIG. 20 illustrates a perspective view of a U-joint, in accordance with one or more implementations.

Referring to FIG. 20, a perspective view of a U-joint is depicted.

Figure 21:
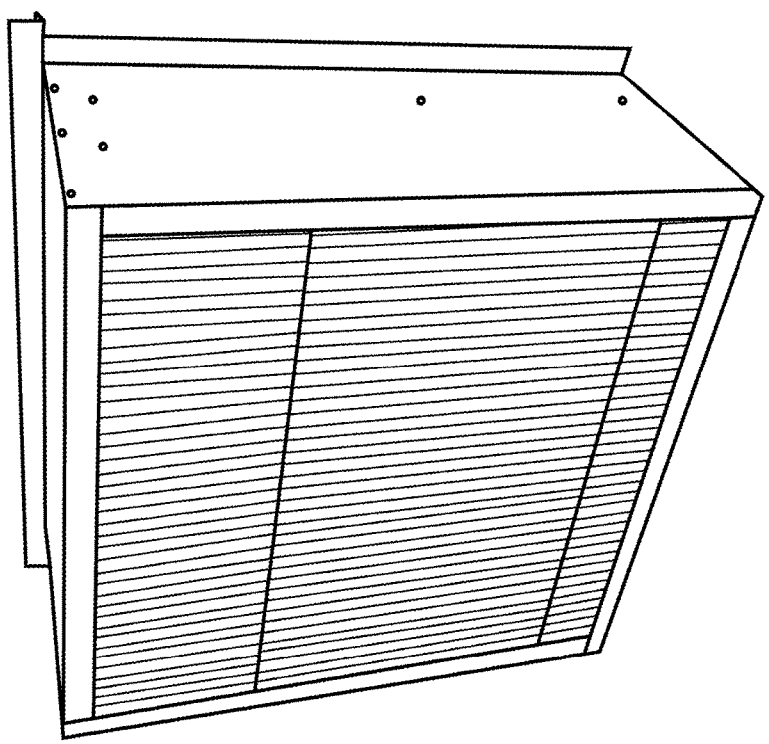
FIG. 21 illustrates a perspective view of a light trap in the middle of a housing, in accordance with one or more implementations.

Referring to FIG. 21, a perspective view of a light trap in the middle of a housing is depicted.

It is noteworthy that cross-connectors may be included and configured to provide a junction between square tubing and round tubing. In some implementations, cross-connectors may be included and configured to provide a junction between two-inch square tubing and one-and-three-eighths-inch round tubing.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. An enclosure system with automated light deprivation shade deployment and retraction, the system comprising:
   a plurality of trusses oriented parallel to each other and including at least a horizontal interior member with two diagonal members extending downwardly from ends thereof and two vertical members extending downwardly from the diagonal members on portions thereof opposite said horizontal member;
   a shade structure having a fixed edge fixed to one of the trusses and a leading edge;
   a leader arch coupled to the leading edge and including a horizontal bar extending between two or more diagonal bars at opposite ends thereof, and with vertical bars extending downwardly from the diagonal bars on portions of the diagonal bars opposite the horizontal bar;
   wires extending longitudinally between the truss members and along lines perpendicular to planes in which the truss members are oriented, and inboard of shade curtains of the shade structure; and
   a drive system configured to drive the leading edge from a first position closer to the fixed edge of the shade structure to a second position closer to a deployed position for the shade structure, with the leader arch held and at least partially guided by the wires upon which the leader arch rides as the leading edge moves.

2. The system of claim 1, further comprising a C-channel configured to capture the leading edge.

3. The system of claim 1, further comprising a gutter disposed along a bottom of the shade curtains, the gutter being configured for capturing the shade structure.

4. The system of claim 1, wherein the shade structure is configured for containing light.

5. The system of claim 1, further comprising universal joints configured to drive the system.

6. The system of claim 1, wherein the shade structure includes the shade curtains, the shade curtains configured to block light.

7. The system of claim 1, further comprising a double-wheeled track assembly configured to receive the shade structure.

8. The system of claim 7, wherein the double-wheeled track assembly includes four wheels.

9. The system of claim 8, wherein two of the four wheels support the shade structure when the shade structure is in an open configuration.

10. The system of claim 9, wherein the other two of the four wheels support the shade structure when the shade structure is in a closed configuration.

11. The system of claim 1, further comprising multiple rack and pinion connectors configured to drive the system.

12. The system of claim 1, further comprising eyebolts configured to guide the shade structure.

13. The system of claim 1, further comprising a light trap housing incorporated on one or more of fans, louvers, cooling walls, or other items, the light trap housing being configured to capture light.

14. The system of claim 1, further comprising cross-connectors configured to provide a junction between square tubing and round tubing.

* * * * *